Nov. 22, 1927.  
H. E. ADAMS ET AL  
1,649,885  
CONTROL MEANS FOR LIQUID LEVEL INDICATORS  
Filed Aug. 13, 1925   3 Sheets-Sheet 2
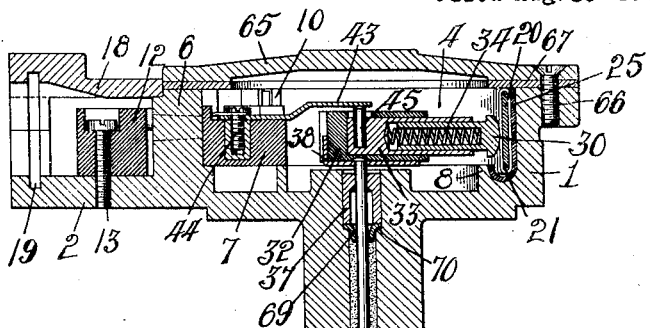
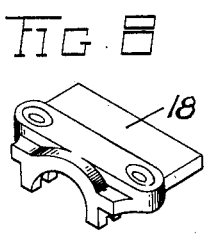
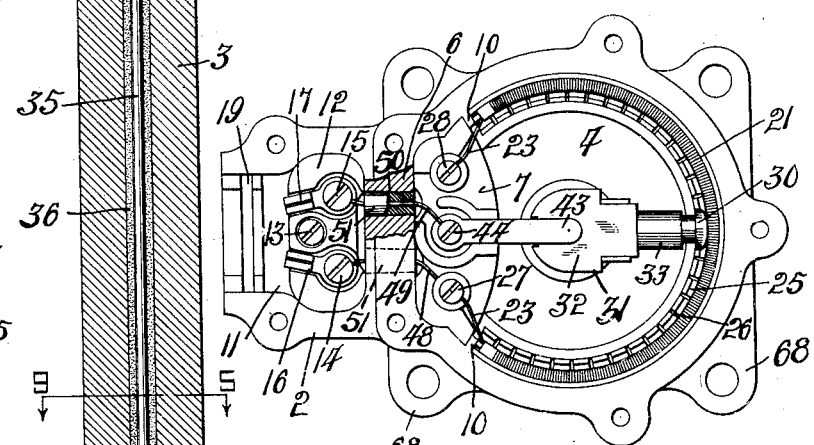
Inventor  
Harry E. Adams.  
Hugh L. Decker.  
By Owen Owen & Crampton.  
Attorneys.

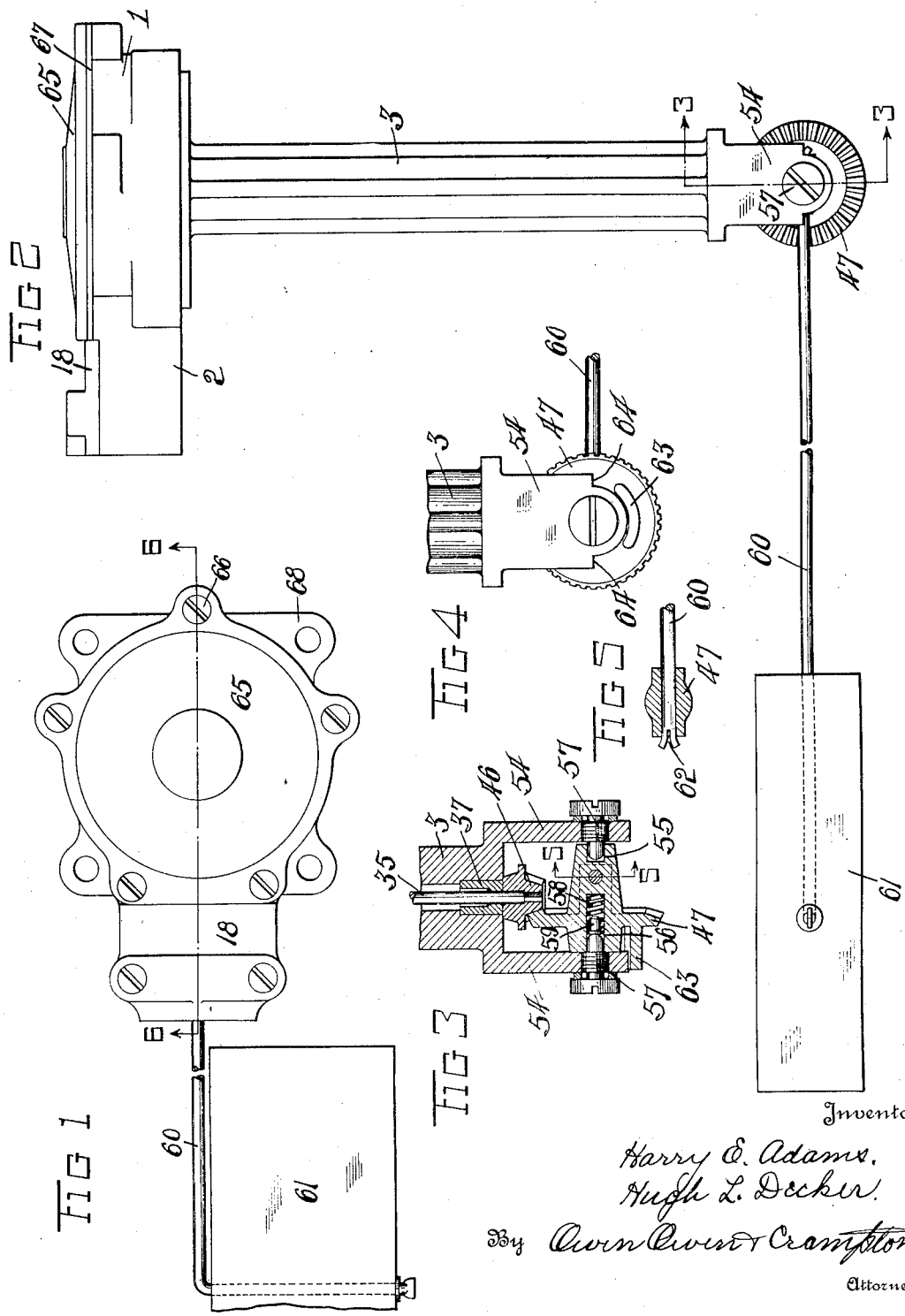

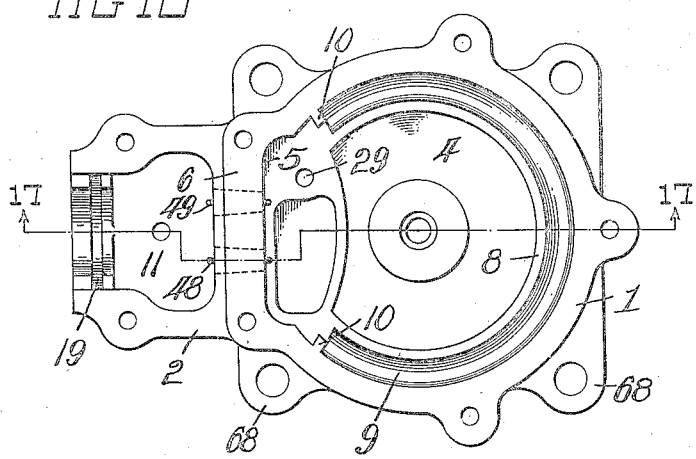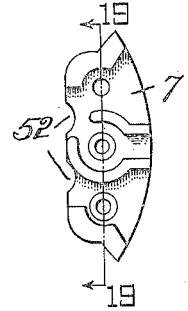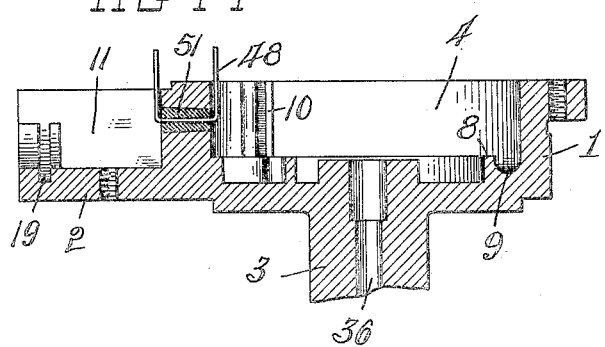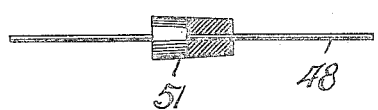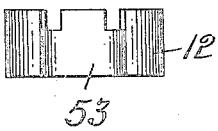

Patented Nov. 22, 1927.

1,649,885

UNITED STATES PATENT OFFICE.

HARRY E. ADAMS AND HUGH L. DECKER, OF TOLEDO, OHIO, ASSIGNORS TO THE W. G. NAGEL ELECTRIC COMPANY, OF TOLEDO, OHIO, A CORPORATION OF OHIO.

CONTROL MEANS FOR LIQUID-LEVEL INDICATORS.

Application filed August 13, 1925. Serial No. 49,978.

Our invention relates to liquid level indicators, and particularly to those of the type having float operated rheostats in connection therewith.

The general object of the invention is the provision of an instrument of the character described having certain features of improvement over those heretofore used, whereby the efficiency thereof is increased and their practicability and commercial value enhanced.

An object of the invention is the provision of a new and improved mounting for the float gear, whereby the original mounting and adjustment thereof will be made easier and wear between the float gear and coacting pinion automatically compensated for. This wear compensating feature is particularly important in instruments where the float movements are communicated to the movable contact member of the rheostat disposed in circuit with the level indicating instrument, as otherwise accurate readings cannot be maintained.

Other objects of the invention reside in the construction and manner of mounting the rheostat resistance unit; the manner of adjustably mounting the swinging contact carrying arm of the rheostat in the actuating spindle; the manner of maintaining and sealing said spindle to prevent the escape of air under pressure from the liquid chamber in which the float operates and also to prevent the leakage or passage of gasoline or other liquid from such chamber into the chamber containing the rheostat contact parts; the employment of certain current conducting parts of the rheostat to exert a continual axial pressure on the contact-arm actuating spindle to maintain, or assist in maintaining, the associated pinion and coacting float gear in close engagement to prevent play therebetween; and the maintaining of the rheostat contact parts in a closed compartment that is hermetically sealed and separated from a compartment containing easily accessible main lead connections.

Other objects and advantages of the invention will be apparent from the following detailed description.

While the invention as a whole, as well as the different parts and features thereof are capable of embodiment in different forms, one embodiment thereof, which at the present time is considered the preferred commercial embodiment, is illustrated in the accompanying drawings, in which,—

Figure 1 is a top plan view of a device embodying the invention with parts broken away. Fig. 2 is a side elevation thereof with a portion of the float rod broken away. Fig. 3 is an enlarged section on the line 3—3 in Fig 2. Fig. 4 is a left side elevation of the portion of the device shown in Fig. 3. Fig. 5 is a section on the line 5—5 in Fig 3 illustrating the manner of attaching the float rod to its gear. Fig. 6 is an enlarged sectional elevation on the line 6—6 in Fig. 1, with a part of the float means broken away. Fig. 7 is a plan view of the upper end portion of the device with the covers removed and with parts broken away. Fig. 8 is a perspective view of the cover for the main lead terminal chamber. Fig. 9 is a cross section on the line 9—9 in Fig. 6. Figs. 10 and 11 are fragmentary perspective views of the coil carrying insulation strip of the resistance element as it appears respectively before and after insertion into the rheostat chamber. Fig. 12 is a perspective view of the adjustable contact arm carrying member of the rheostat. Fig. 13 is a perspective view of the rheostat contact arm and associated parts removed from its carrying member. Fig. 14 is an enlarged perspective view of an end portion of the resistance unit of the rheostat with the clamping bands for the end portion of the resistance coil removed. Fig. 15 is a similar enlarged view with the clamping band in position. Fig. 16 is a top view of the rheostat casing member with the covers and nearly all detachable parts removed therefrom. Fig. 17 is a section on the line 17—17 in Fig. 16. Fig 18 is a top plan view of the terminal block disposed within the rheostat chamber. Fig. 19 is a section on the line 19—19 in Fig 18. Figs. 20 and 21 are top and inner side views of the outer or main terminal block. Fig. 22 is an enlarged side view of one of the terminal connecting wires and its carrying plug, with the latter partly in section.

Referring to the drawings, 1 designates a shallow casing or frame of substantially cylindrical form, in the present instance, and having an extension 2 at one side and a shank or arm 3 projecting from its bottom substantially axially of the body part 1. The casing part 1 is hollow to form an open top chamber 4 which is circular, except for an incut 5 in the wall portion 6 thereof adjacent to the extension 2, such incut being elongated transversely of the chamber axis and adapted to partially receive a terminal block 7 of insulating material.

The bottom of the chamber 4 is provided, in concentric slightly spaced relation to its circular wall portion, with a segmental rib 8 terminating at its ends adjacent to the incut 5, and cooperating with the wall of the chamber 4 to form a segmental groove 9 for receiving the variable resistance unit of the rheostat, as hereinafter described. A rib 10 projects inwardly from the side wall of the casing 1 at each end of the groove 9 and these ribs form guides for engagement with the ends of the resistance unit to facilitate assembly and to hold said unit in proper position within the casing. The ribs 10 also coact with the ends of the terminal block 7 to permit a downward sliding of the block into place within the incut side portion 5 of the chamber 4 and to prevent lateral displacement thereof. A portion of the floor of the chamber 4 is raised to a level with the rib 8 for the terminal block to seat on.

The casing extension 2 is provided with an open top chamber 11 spaced from the chamber 4 by the wall 6, and has its outer end opening without the end of the extension and restricted to form a neck portion for the chamber. An outer wire terminal block 12 of insulating material is fitted into the broadened end portion of the chamber 11, being secured therein by a screw 13 and carrying the terminal screws 14 and 15 on its top or outer side for engaging the terminals of the main leads 16 and 17, respectively. The cover 18 is adapted to seat over and close the top of the extension 2 and cooperate with the outer end of the extension to form a round neck opening for the chamber 11 through which the cable carrying the main lead wires projects. It is preferable to provide the cable end with an anchoring ferrule having an external annular flange for seating in a complemental groove 19 in the neck wall.

The resistance unit of the rheostat includes a ribbon-like strip 20 of stiff insulating material, such for instance as vulcanized fibre, and around this with its convolutions slightly spaced from each other, is wound the resistance coil 21. Each end of the wire forming the resistance coil, after making the last convolution at such end, is passed through an aperture 22 in the respective end portion of the insulating strip 20 and is then carried to the adjacent side edge of the strip and extended upwardly along such side edge to form the terminal end 23. A band 24 of brass or other suitable material is then wrapped closely around the end of the insulating strip and the adjacent terminal end portion of the coil and is soldered or otherwise secured in such position and to the coil terminal to prevent unwinding of the coil. The insulating strip with its coil is then bent in segmental form and inserted edgewise into the groove 9 of the casing chamber 4, the strip being of proper length for its ends to abut against the internal stop ribs 10 of the casing.

The resistance coil is insulated from the side wall of the chamber 4 and the walls of the groove 9 by a lining insulating strip 25, which is disposed between the coil strip and the casing wall, and has its lower edge bent inwardly and upwardly to provide an insulating lining for the groove 9. The lower edge portion of the strip 25 is provided with a series of incuts 26 to facilitate bending the strip to conform to the arc of the groove 9. The lining strip 25 may be placed in the chamber 4 before the insertion of the resistance strip therein or the two strips may be assembled without the casing and then inserted as a unit therein. In assembling it is found that if the two strips are placed together without the casing with the lower incut edge of the lining strip projecting below the resistance strip, the engagement of such lower edge of the lining strip with the wall of the groove 9, when the strips are forced downwardly into position within the casing, will cause the lower edge of the lining strip to turn inwardly and upwardly in lining relation to the groove, as shown in Fig. 6. When the resistance unit has been mounted in the casing, one end terminal 23 of the coil is secured to the adjacent binding screw 27 in the terminal block 7 and the other end terminal of the coil is secured to the binding screw 28 in the block 7. The screws 27 and 28 are mounted in opposite end portions of the block 7, and said block should be positioned in its seat in the incut portion 5 of the chamber 4 before connecting the coil terminals thereto. The screw 28 passes through the block 7 and enters a threaded socket 29 in the chamber bottom to retain the block rigidly in assembled position within the chamber.

The flat inner peripheral surface of the resistance coil is engaged by the outer rounded end of a contact plunger 30, which slidingly works in a swinging carrying arm 31 lengthwise thereof and radially of the resistance unit. The arm 31 preferably comprises a body portion 32, of bakelite or other suitable insulating material, and a core-piece 33 of electrical conducting material, which has its inner end extending across the swinging axis of the arm and its outer end projected beyond the end of the body 32 and longitudinally socketed to receive the inner end of the plunger 30. A coil spring 34 is positioned in the base of said socket to exert an outward yielding pressure against the plunger. The arm 31 is carried at the upper or adjacent end of a shaft 35 which is disposed axially of the resistance coil and projects through and has a bearing in each end of a bore 36 provided lengthwise through the bottom extension 3 of the casing 1. The bore is larger than the shaft to provide a packing space around the latter and has its ends enlarged to receive bearing bushings 37.

The arm 31 instead of being fixedly attached directly to the shaft end is preferably carried by a holder 38 that is fixed to the shaft. This holder comprises a sheet metal plate secured to the shaft end with its flat sides at right angles to the shaft axis, and has at one side of the shaft a single turned up spur 39 and at the opposite side of the shaft two turned up spurs 40, which latter are spaced equally and in opposite directions from a radial line of the shaft, with the flat side thereof in facing relation.

The arm-body 32 is adapted to seat down in the holder 38 and has its outer end, relative to the core-piece 33, provided with a recess 41 for receiving the tongue 39, and has its inner end portion narrowed or provided with a notch 42 at each side thereof for receiving the respective spurs 40, the narrowed portion of the arm body being of suitable width to fit down between the two spurs 40. The spurs 39 and 40 of the holder are adapted to coact with the arm body in such manner as to firmly hold it therein, except, that the arm, if desired, may be lifted from within the holder.

The spurs 40 of the holder 38 are laterally bendable so that a slight lateral swinging adjustment of the arm 31 with respect to the holder can be accomplished by bending the two spurs 40 slightly one way or the other. This is an important feature in obtaining proper calibration of the indicating instrument with which the rheostat is connected, for after assembling the rheostat parts, it is necessary to have different predetermined positions of the associated float, which is employed to actuate the shaft 35, accurately indicated by the associated indicator gauge. To accomplish this, it is frequently necessary to slightly adjust the contact carrying arm 31 one way or the other with respect to the shaft 35 to effect the proper reading on the gauge. It is for this reason principally that the contact arm is mounted for adjustment relative to the shaft 35, and the particular means shown for mounting and adjusting the arm is a simple means from a manufacturing and assembling standpoint to accomplish this purpose.

The lead for the movable contact of the rheostat comprises a spring finger 43 of suitable conducting material which is fixedly secured at one end to the top of the terminal block 7 by a screw 44 and has its free end extending over the swinging axis of the arm 31 and bearing downward against a pin or stud 45 which projects from the inner end of the core piece 33 above the top of the arm body 32 and is disposed in axial relation to the shaft 35. One advantage of this manner of lead connection with the movable contact plunger 30 is that the spring lead finger 43 exerts a continual downward axial pressure on the contact arm to retain it to its seat in the holder 38 and also a downward pressure on the shaft 35 to retain the pinion 46 at the lower end thereof continually in close meshing engagement with the float gear 47, thereby assisting in preventing play between the gear and pinion. A sufficient space should be provided between the underside of the holder 38 and the bottom of the casing chamber 4 to allow for this feature.

The binding screws or terminals 14 and 27 on the terminal blocks 12 and 7, respectively, are connected by a lead wire 48, while the binding screws 15 and 44 on the same blocks are connected by a lead wire 49. The binding screw 28 which threads into the casing 1 provides a ground through the casing for the end of the resistance coil 21 opposed to that connected to the binding screw 27.

The lead wires 48 and 49 pass through respective openings 50 in the partition wall 6 between the casing chambers 4 and 11, and, inasmuch as it is quite important to maintain the rheostat chamber 4 hermetically sealed, each of said lead wires is carried by and projects centrally through a respective plug 51 (Figs. 7, 17 and 22) that is mounted in the associated opening 50. These plugs are made of a suitable insulating material so as to constitute insulating bushings for the leads and are tapered so that when forced into the openings 50 they will completely and closely fill the same and be compressed to tightly bind the lead wires passing therethrough. The plugs 51 after having the lead wires threaded therethrough are forced into the casing openings 50 before the mounting of the terminal plugs 7 and 12 in the casing, and in order to permit the blocks to be slid down into place within the casing after the positioning of such lead wires, the ends of the lead wires are bent upwardly in close relation to the respective sides of the partition 6 and the terminal blocks have recesses 52 and 53, respectively, in their inner sides to accommodate the wires. After the plugs have been positioned in the casing, the ends of the lead wires are bent down over the blocks and secured to the proper binding screws. This makes a very simple assembling arrangement for the lead wires and terminal blocks.

The float gear 47 is mounted between the fork arms 54 provided at the lower end of the casing extension 3, and the hub portion of this gear is of sufficient length at each side of the gear flange to fit between the fork arms and permit a slight longitudinal play of the hub when the gear flange is in meshing engagement with the pinion 46. The gear hub is provided in opposite ends with axially aligned sockets 55 and 56, one being longer than the other and projecting inwardly, in the present instance, beyond the gear flange from the outer side thereof. Bearing screws 57 are mounted in axial alignment in the fork arms 54 and each has a stub end projecting into the adjacent hub socket of the gear and forming a journal bearing therefor. A coiled expansion spring 58 and plunger 59 are mounted in the inner end of the aligned socket 56 and act at the inner end of the adjacent bearing screw 57 to tend to force the gear flange toward the axis of the pinion 46 so as to maintain a continual close meshing of the gear and pinion and to compensate for wear. The continual engagement of the gear and pinion and the elimination of play from wear or other cause is an important feature in liquid level indicators of this character, as a slight play between the gears might effect a decided error in the reading of the associated indicating instrument. A float arm 60, in the present instance, of rod or heavy wire form, is secured at its inner end to and projects radially from the hub of the gear 47. This arm has its outer or free end bent at right angles and pivotally carrying a float 61, which rides on the liquid the level of which is to be gauged, and causes the gear to respond to any difference in the level of the liquid, as well understood in the art. A simple manner of securing the arm 60 to the gear hub is to force the inner end of the arm through a transverse opening in the hub and to split and spread the end of the arm without the side of the hub, as shown at 62 in Fig. 5, to prevent withdrawal of the arm. A stop lug 63 is provided on one side of the gear flange for coaction with stop shoulders 64 on the adjacent fork arm 54 to limit the permissible rocking movements of the gear.

When the rheostat parts and the operating means therefor have all been properly assembled in connection with the casing 1, 2, 3 and the parts adjusted to obtain accurate reading on an indicating instrument like that with which it is to be associated in use, the open top of the rheostat chamber 4 is sealed by a cover 65, which is secured to the casing by screws 66. A gasket 67 is interposed between the meeting surfaces of the casing and cover, and a suitable cement is employed not only to hermetically seal the joints between the cover parts and casing but also to tend to prevent unauthorized removal of the cover by users after the rheostat parts have been assembled and properly adjusted at the factory. The cover 18 on the extension 2 is not sealed in this manner, as it is necessary to remove the same in making installations.

The instrument casing is intended to be mounted on the liquid container with which associated, with the bottom extension 3 projecting down into the container through an opening therein and with the bottom portion of the casing, part 1, fitting into or onto the marginal wall of the opening in a manner to tightly close the same. The casing 1 is provided around its lower edge with a plurality of apertured foot lugs 68 for receiving securing bolts or screws.

It is important, especially when the instrument is used in connection with a container for hydrocarbon liquids, to seal the space around the shaft 35 within the bore 36 so as to prevent the escape of liquid and combustible fumes and also fluid pressure from the liquid through said bore and into the chamber 4 containing the electrical contact parts. This sealing material should also be of a nature adapting it to serve as a lubricant and should be incapable of being cut by or entering into solution with the liquid the level of which is being measured. A material which has been found suitable for the purpose is composed of glycerine and corn starch in substantially the proportion of two pounds of the former to four ounces of the latter, thinned with water and boiled to obtain a jelly-like substance. This material forms the subject-matter of a copending application and is, therefore, not claimed in itself herein.

To further insure against the escape of liquid fumes and air pressure through the bore 36 and into the chamber 4 when the instrument is used in connection with a container of the pressure feed type, for which the present instrument is particularly adapted, a pliant cup-shaped or conical form of gasket 69, preferably of soft leather, is mounted around the shaft 35 within the inner end portion of the bore 36. The large end of the gasket is formed with an external annular flange 70 that is gripped between the inner bearing bushing 37 and the bottom of the bore enlargement in which disposed, and the small end of the gasket is directed toward the opposite end of the bore and closely hugs the shaft. Any pressure escaping from the container is exerted against the outer side of the small end of the gasket and tends to cause it to more closely hug the shaft and prevent leakage by the gasket. It is also desirable to provide one of these gaskets 69 at the outer end portion of the bore 36 with its small end pointing toward the other gasket to prevent escape of the sealing material from the bore.

In the designing of this instrument it has been the purpose not only to provide an instrument which will be highly practical and efficient from a commercial standpoint, but also to have the different parts thereof so located, constructed and mounted as to facilitate assembling and to secure the greatest speed of production with ease, accuracy and economy of assembly of the parts. The preferred order of assembly of the parts for this purpose is as follows:

The upper bearing bushings 37 and gasket 69 are first positioned in the casing bore 36, after which the bore is substantially filled with the combination lubricant and sealing material from the lower end thereof and the lower bushing 37 then forced into the lower end of the bore. The shaft 35 with the holder 38 attached is then inserted down through the bushings, gasket and bore from the upper end of the latter. The pinion 46 is then secured to the lower end of the shaft by spinning the projecting end of the shaft over the outer hub end of the pinion. The insulating plugs 51, with the connecting wires 48 and 49 inserted therethrough, are then mounted in the openings 50 of the casing part 6, the plugs being forced under pressure into the openings to closely fill the same and to assist in compressing and sealing the wires in the plugs. This being done, the projecting ends of the wires 48 and 49 are bent outwardly and the terminal plug 7 for the resistance unit is then positioned within the incut portion 5 of the chamber 4. The inside of the groove 9 and wall of the casing 1 are then coated with an insulating varnish or suitable cement, and the insulating lining strip 25 for the resistance unit is then placed around the inner sidewall of the casing with its lower slotted edge lining the groove 9. The resistance unit 20, 21 is then bent to conform to the curve of the wall of the chamber 4 and is forced down within the lining strip 25, being properly positioned lengthwise within the chamber by the guiding action of the casing flanges 10 in coacttion with the ends of the insulating strip 20 of the unit. The ends of the leads 23 of the resistance coil 21, which preferably carry eyelets 23ª for the purpose, are engaged with the respective binding screws 27 and 28, the latter being threaded into the bottom of the casing to secure the terminal block in position. The inner end of the connecting wire 48 is engaged with the binding screw 27 when tightening the same. The terminal block 12 for the main lead wires is then inserted in the chamber 11 in the side extension 2 of the casing and secured in position by the screw 13, after which the outer ends of the connecting wires 48 and 49 may be engaged respectively with the binding screws 14 and 15 of the plugs 12. The contact carrying arm 32 and its contact parts are then assembled and the arm is forced down within the holder 38 with the spurs 39 and 40 entering the recesses 41 and 42, respectively, of the arm and with the contact plunger 30 in outward thrust engagement with the inner periphery of the resistance coil. The spring lead finger 43 is then secured in position on the terminal plug 7 by the screw 44 and with the free end of the spring bearing inward against the stud 45 on the arm body 32, thereby exerting an inward pressure on the arm to hold it to its seat in the holder 38 and also exerting an inward axial pressure on the shaft 35 to assist in maintaining its pinion 46 in close engagement with the float gear 47. Before tightening the screw 44 the inner end of the wire connection 49 is engaged therewith. The float gear 47 with the float attached is then mounted between the fork arms of the casing extension 3 on the pivot screws 57 and with the spring and plunger 58 and 59 located in the socket 56 of the gear so as to act on the adjacent screw pivot and gear to press the latter into close engagement with the pinion 46. This completes the assembly of the different parts of the instrument, except for the mounting and sealing of the cover 65 on the casing part 1, after the proper adjustment and calibration of the parts for correct reading has been accomplished, and for the mounting of the cover plate 18 over the wire terminal chamber 11. It will, of course, be understood that the order of assembling of the parts may be varied, as desired, and that the different parts and the arrangement thereof are capable of numerous modifications and changes without departing from the spirit of the claims.

Having thus described our invention, what we claim as new and desire to secure by Letters Patent is:

1. In an instrument of the class described, a casing having a rheostat enclosing chamber with internal guide ribs, a segmental rheostat resistance unit mounted in said chamber partially around the wall thereof, a terminal block mounted in the chamber between the ends of the resistance unit, said unit and block being held against lateral movement by the casing and ribs, and being guided thereby for sliding movements into and out of the chamber in planes parallel to its axis.

2. In an instrument of the class described, a casing forming a rheostat chamber and a wire terminal chamber with a common dividing wall there between, rheostat contact elements in the first chamber, a terminal block mounted in each chamber next to said dividing wall, and electrical connection between said blocks through the wall and with the rheostat contact parts.

3. In an instrument of the class described, a casing forming a rheostat resistance-unit chamber and a wire terminal chamber with a common dividing wall therebetween having openings therethrough, insulated plugs filling said openings, connecting wires carried by and projecting through the plugs, and a terminal block mounted in each chamber close to said connecting wall and having terminal connections on their tops for said connecting wires and also having inner side portions cut away to expose the ends of said plugs and permit the passage of the connecting wires therethrough.

4. In an instrument of the class described, a casing forming a chamber for rheostat contact parts adapted to be mounted on a liquid container and having a part extending into the container, said part having a longitudinal bore therethrough with its end portions enlarged, a bearing bushing mounted in each enlargement of the bore, a shaft projecting through the bore and journaled in said bushings and adapted to actuate parts within the casing chamber, means for causing the shaft to rotate upon a varying of the liquid level in the associated container, and a soft conical gasket of fibrous material having its large end flanged and closely clamped between the inner end of the outer bushing and the bottom of the bore enlargement in which disposed, and having its small end projecting toward the inner end of the shaft and closely hugging the shaft so that pressure against the conical end of the gasket will cause it to more tightly hug the shaft.

5. In an instrument of the class described, a casing forming a chamber, a segmental resistance unit mounted in said chamber, a terminal block mounted in the chamber adjacent to and between the ends of the resistance unit, a shaft journaled in the casing axially of the chamber, a contact arm carried by the shaft within the chamber and having its outer end in contact with the resistance unit, a spring lead finger carried by and projecting from the terminal block with its free end bearing axially against said arm and having electrical connection through the arm with the resistance unit engaging contact thereof, and lead connections with said resistance unit and spring finger mounted on said block.

6. In an instrument of the class described, a shaft, a holder carried by an end of the shaft, an arm of insulating material mounted in said holder for turning movements with it and the shaft, an electrical contact carried by and projecting from the arm for swinging movements therewith, and a lead connection for said contact.

7. In an instrument of the class described, a shaft, a holder mounted on an end of the shaft, an arm mounted in the holder for swinging movements therewith, a member of insulating material mounted in the holder, contact means carried by and projecting from the holder for swinging movements therewith, and a lead having connection with the contact means axially of the shaft.

8. In an instrument of the class described, a shaft, a holder fixed to an end of the shaft, a contact arm mounted in the holder for turning movements therewith and having a conductor part projecting from the side thereof opposed to the adjacent shaft end and disposed axially of the shaft, and spring lead means anchored at a side of the arm and having a part yieldingly bearing against said conductor part to provide an electrical connection therebetween and to retain the arm in said holder.

9. In an instrument of the class described, a shaft, a holder carried by the shaft at an end thereof and having spurs projecting therefrom lengthwise of the shaft, one spur being at one side of the shaft and two spurs being at the opposite side of the shaft spaced from each other, a contact arm mounted in the holder within the spurs, two of said spurs being adjustable to permit a rotary adjustment of the arm relative to the shaft.

10. In an instrument of the class described, a shaft, a holder carried by an end of the shaft and having bendable spurs projecting therefrom lengthwise of the shaft, a contact arm mounted in the holder and held against lateral movement relative thereto by said spurs and being rotatably adjustable relative to the shaft by lateral bending of certain of said spurs.

11. In an instrument of the class described, a contact arm holder mounted for rotary movements, a contact arm seated in the holder for rotary movements therewith, and a spring leader finger in electrical connection with the arm contact axially of its axis and serving to hold the arm in the holder.

12. In an instrument of the class described, a contact arm holder having spurs projecting therefrom, a contact arm mounted in the holder between the spurs thereof, and spring leader means bearing against the outer side of the arm axially of its swinging axis and serving to hold the arm seated in the holder.

13. In an instrument of the class described, a shaft, a holder plate secured to an end portion of the shaft with the face planes thereof transverse to the shaft axis, said plate having spurs projecting therefrom lengthwise of the shaft away from its adjacent end, a contact arm seated in the holder and held against lateral movements relative to the holder by the spurs thereof, portions of said spurs being bendable to permit a rotary adjustment of the arm relative to the shaft, and spring lead means bearing against the outer side of the arm to retain it seated in the holder and to provide an electrical connection for the contact portion of the arm.

In testimony whereof we have hereunto signed our names to this specification.

HARRY E. ADAMS.
HUGH L. DECKER.